(12) United States Patent
Yu

(10) Patent No.: US 8,931,093 B2
(45) Date of Patent: Jan. 6, 2015

(54) MALICIOUS REQUEST ATTRIBUTION

(71) Applicant: Bank of America Corporation, Charlotte, NC (US)

(72) Inventor: Sounil Yu, Reston, VA (US)

(73) Assignee: Bank of America Corporation, Charlotte, NC (US)

(*) Notice: Subject to any disclaimer, the term of this patent is extended or adjusted under 35 U.S.C. 154(b) by 29 days.

(21) Appl. No.: 13/833,739

(22) Filed: Mar. 15, 2013

(65) Prior Publication Data

US 2014/0283028 A1 Sep. 18, 2014

(51) Int. Cl.
*G06F 21/00* (2013.01)
*H04L 29/06* (2006.01)

(52) U.S. Cl.
CPC .................. *H04L 63/1441* (2013.01)
USPC ............ 726/22; 726/23; 726/24; 726/25

(58) Field of Classification Search
USPC ..................................... 726/22–25
See application file for complete search history.

(56) References Cited

U.S. PATENT DOCUMENTS

2008/0244748 A1* 10/2008 Neystadt et al. ............... 726/25

* cited by examiner

*Primary Examiner* — Ghazal Shehni
(74) *Attorney, Agent, or Firm* — Banner & Witcoff, Ltd.; Michael A. Springs

(57) ABSTRACT

Methods, apparatuses, and computer readable media for malicious request attribution are presented. For example, according to one aspect, requests for one or more records may be received from a requesting computing device. A determination may be made that the requests are of a malicious nature. Responsive to determining that the requests are of a malicious nature, one or more requests for obtaining information about the requesting computing device may be generated, and communicated to the requesting computing device. In some embodiments, at least one of the one or more requests for obtaining information about the requesting computing device may be configured to cause the requesting computing device to fail to properly render at least a portion of a web page comprising at least one of the one or more records.

20 Claims, 7 Drawing Sheets

MALICIOUS REQUEST ATTRIBUTION

BACKGROUND

As computing devices and the applications they support increasingly pervade aspects of society, there is a growing need to attribute communications received from computing devices (e.g., to an individual, location, or institution). This need is particularly acute for transactions whose historical counterparts, relied in large part on physical proximity for attribution (e.g., financial transactions, voting, and the like). In particular, the ability of computers and modern telecommunications technology to enable transactions, once performed at arm's length, to be performed around the world in near real-time, has emboldened users that desire to engage in unauthorized and/or malicious activity. Accordingly, a need exists for malicious request attribution.

SUMMARY

The following presents a simplified summary in order to provide a basic understanding of some aspects of the disclosure. This summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to methods, apparatuses, and computer readable media for malicious request attribution. In some embodiments, requests for one or more records may be received from a requesting computing device. A determination may be made that the requests are of a malicious nature. Responsive to determining that the requests are of a malicious nature, one or more requests for obtaining information about the requesting computing device may be generated, and communicated to the requesting computing device. In some embodiments, at least one of the one or more requests for obtaining information about the requesting computing device may be configured to cause the requesting computing device to fail to properly render at least a portion of a web page comprising at least one of the one or more records.

In some embodiments, the determination that the requests are of a malicious nature may be based in part on the one or more records requested, an Internet Protocol (IP) address of the requesting computing device, the use of one or more shell accounts, and/or the use of one or more accounts that are suspected of having been compromised. Additionally or alternatively, the determination that the requests are of a malicious nature may be based in part on determining that the one or more requests were generated by an automated script. In some embodiments, determining that the one or more requests were generated by an automated script may include detecting one or more sequence patterns indicative of an automated script and/or one or more timing patterns indicative of an automated script. In some embodiments, the one or more requests for obtaining information about the requesting computing device may be configured to interrupt the automated script In some embodiments, subsequent requests for the one or more records and/or subsequent requests received from the requesting computing device may be logged.

In some embodiments, the one or more requests for obtaining information about the requesting computing device may include requests for obtaining an IP address of the requesting computing device, information stored in one or more cookies on the requesting computing device, information identifying a browser utilized by the requesting computing device, information identifying one or more plugins enabled by a browser utilized by the requesting computing device, information identifying one or more fonts available on the requesting computing device, information identifying one or more screen resolutions utilized by the requesting computing device, information identifying an operating system utilized by the requesting computing device, and/or information identifying a hardware configuration of the requesting computing device.

In some embodiments, the requests for the one or more records may be received via one or more proxy devices being intentionally utilized by a user of the requesting computing device to obfuscate the requesting computing device. In such embodiments, determining that the requests are of a malicious nature may include detecting utilization of the one or more proxy devices intentionally utilized by the user of the requesting computing device. Additionally or alternatively, the one or more requests for obtaining information about the requesting computing device may include requests configured to require the requesting computing device to provide information identifying one or more attributes about the requesting computing device via the one or more proxy devices intentionally utilized by the user of the requesting computing device. Additionally or alternatively, the one or more requests for obtaining information about the requesting computing device may include requests configured to cause the one or more proxy devices intentionally utilized by the user of the requesting computing device to fail to obfuscate one or more attributes of the requesting computing device. Additionally or alternatively, the one or more requests for obtaining information about the requesting computing device may include requests configured to cause subsequent requests for one or more records received via one or more of the one or more proxy devices to fail to successfully obtain the one or more records subsequently requested.

In some embodiments, one or more false values may be provided to the requesting computing device in response to one or more subsequent requests for records received from the requesting computing device. In some embodiments, the requests for the one or more records may include one or more requests for one or more financial account balances. In such embodiments, the one or more false values may include a zero and/or negative balance associated with an account having a positive balance.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
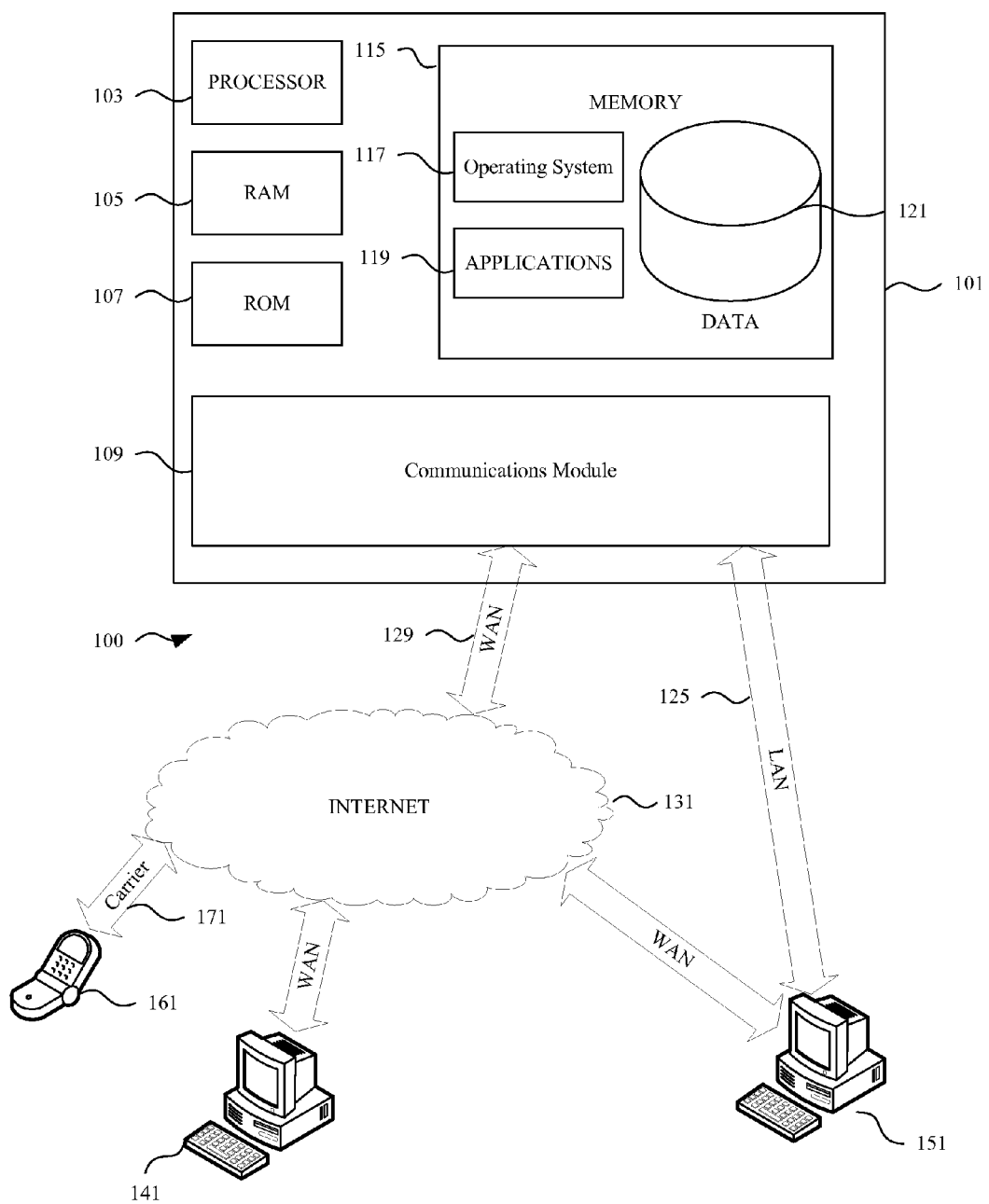
FIG. 1 depicts an illustrative operating environment in which various aspects of the present disclosure may be implemented in accordance with example embodiments.

FIG. 1 depicts an illustrative operating environment in which various aspects of the present disclosure may be implemented in accordance with example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
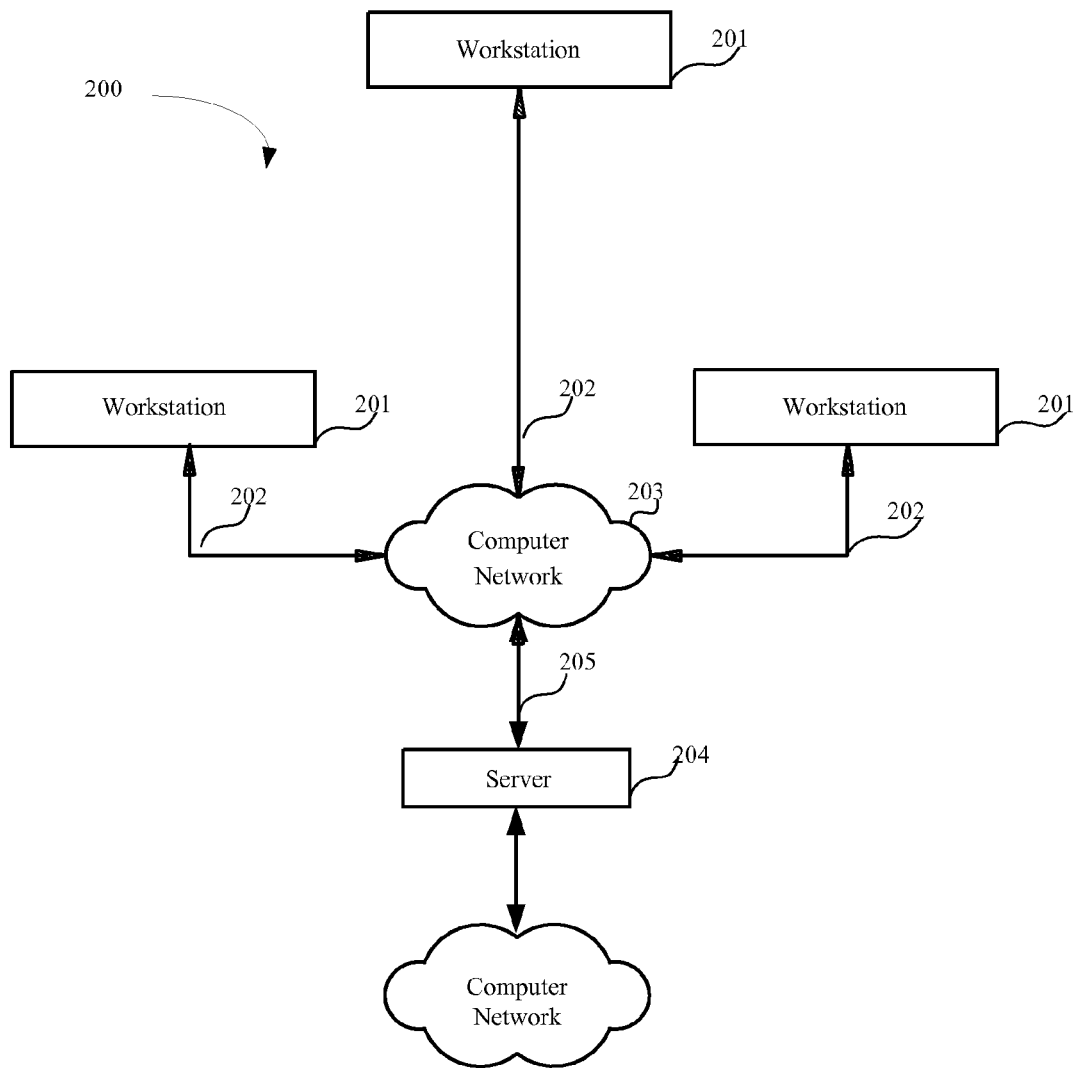
FIG. 2 depicts an illustrative block diagram of workstations and servers that may be used to implement the processes and functions of certain aspects of the present disclosure in accordance with example embodiments.

FIG. 2 depicts an illustrative block diagram of workstations and servers that may be used to implement the processes and functions of certain aspects of the present disclosure in accordance with example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
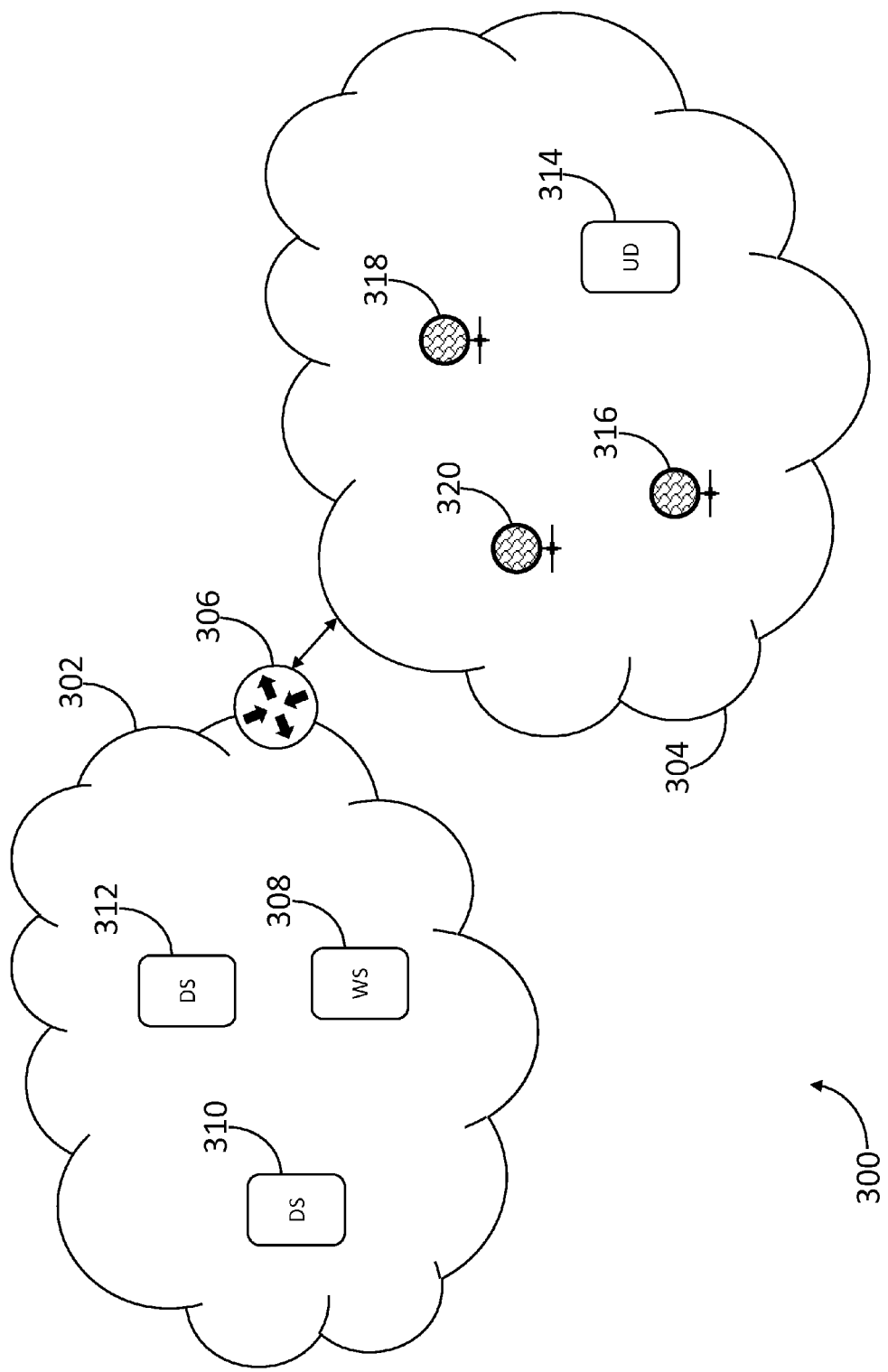
FIG. 3 depicts an illustrative computing environment for malicious request attribution in accordance with one or more aspects of the disclosure.

FIG. 3 depicts an illustrative computing environment for malicious request attribution in accordance with one or more aspects of the disclosure. Referring to FIG. 3, computing environment 300 may include one or more networks. For example, computing environment 300 may include networks 302 and 304. Network 302 may be, for example, a LAN. Network 304 may be, for example, the Internet. Multiple networks within computing environment 300 may be interconnected via one or more routers and/or switches. For example, router 306 may interconnect networks 302 and 304.

Network 302 may include and interconnect one or more computing devices. For example, network 302 may include and interconnect web server 308 and data servers 310 and 312. Web server 308 may be any type of computing device and may generate one or more web pages and/or web page elements and communicate these web pages and/or web page elements to one or more computing devices within computing environment 300. Data servers 310 and 312 may be any type of computing device, for example, a server or cluster of servers hosting one or more databases. Web server 308 may retrieve one or more data records from data servers 310 and/or 312 and utilize such data records in generating one or more web pages and/or web page elements. For example, web server 308 may be a component of an online banking system of a financial institution and may generate one or more web pages and/or web page components pertaining to online banking (e.g., account balance interfaces, account statements, fund transfer interfaces, and the like), and data servers 310 and/or 312 may be backend database servers that store and/or maintain one or more records pertaining to accounts of the financial institution (e.g., account balances, transaction histories, and the like).

Similarly, network 304 may include and interconnect one or more computing devices. For example, network 304 may include and interconnect user device 314 and proxy devices 316, 318, and 320. User device 314 may be any type of computing device. For example, user device 314 may be a server, desktop computer, laptop computer, tablet computer, smartphone, and/or a virtualized computing platform hosted by an underlying physical computing platform. User device 314 may run a web browser and/or customized application for retrieving web pages and/or web page components from one or more computing devices within computing environment 300 and rendering the same for viewing and/or manipulation by one or more users of user device 314. For example, user device 314 may run a web browser, which may request one or more web pages and/or web page components from web server 308. Web server 308 may generate the requested web page(s) and/or web page component(s) and communicate the requested web page(s) and/or web page component(s) to user device 314 (e.g., via networks 302 and 304, and router 306), which may render the web page(s) and/or web page component(s) for viewing and/or manipulation by one or more users of user device 314.

Proxy devices 316, 318, and 320 may be any type of computing device. For example, one or more of proxy devices 316, 318, and/or 320 may be a server, desktop computer, laptop computer, tablet computer, smartphone, and/or a virtualized computing platform hosted by an underlying physical computing platform. One or more of proxy devices 316, 318, and/or 320, and/or an application running thereon, may be controlled by a user (e.g., a user of user device 314), and may perform one or more functions analogous to those of a user device. From the perspective of one or more computing devices within computing environment 300, proxy device 316, 318, and/or 320 may appear to be performing functions on behalf of itself, but may actually be performing such functions in response to directions from one or more distinct computing devices. For example, user device 314 may utilize proxy device 316 to request a web page and/or a web page component from web server 308. From the perspective of web server 308, the request may appear to come from proxy device 316 rather than from user device 314. Similarly, one or more proxy devices may be used in conjunction with one another to form a chain of proxy devices. For example, user device 314 may utilize proxy device 316 to request that proxy device 318 request a web page and/or web page component from web server 308, thereby forming a proxy chain comprised of proxy devices 316 and 318. Similarly, user device 314 may utilize proxy device 316 to request that proxy device 318 request that proxy device 320 request a web page and/or web page component from web server 308, thereby forming a proxy chain comprised of proxy devices 316, 318, and 320.

One or more proxy devices may be utilized by a user for intentionally obfuscating the user and/or the computing device actually being utilized by the user. For example, a user of user device 314 may utilize proxy devices 316, 318, and 320 to request a web page and/or web page component from web server 308, as described above, and may thereby obfuscate that the request is actually on behalf of user device 314. Such a methodology is often employed by a user making a malicious request in an effort to prevent and/or minimize attribution of the malicious request to the user and/or the computing device being utilized by the user. As used herein, "malicious" denotes request(s) that are intended to harm, destroy, or impede, as well as request(s) that are unauthorized. As will be described in greater detail below, one or more aspects of the disclosure may be utilized to identify and attribute such malicious request(s).

One or more of the computing devices described above with respect to FIG. 3 may include one or more of the components described above with respect to FIG. 1 and FIG. 2 for performing one or more of the functions described herein. For example, one or more of router 306, web server 308, data servers 310 and 312, user device 314, and/or proxy devices 316, 318, and 320 may include one or more of the components described above with respect to FIG. 1 and FIG. 2 for performing one or more of the functions described herein.

Figure 4A:
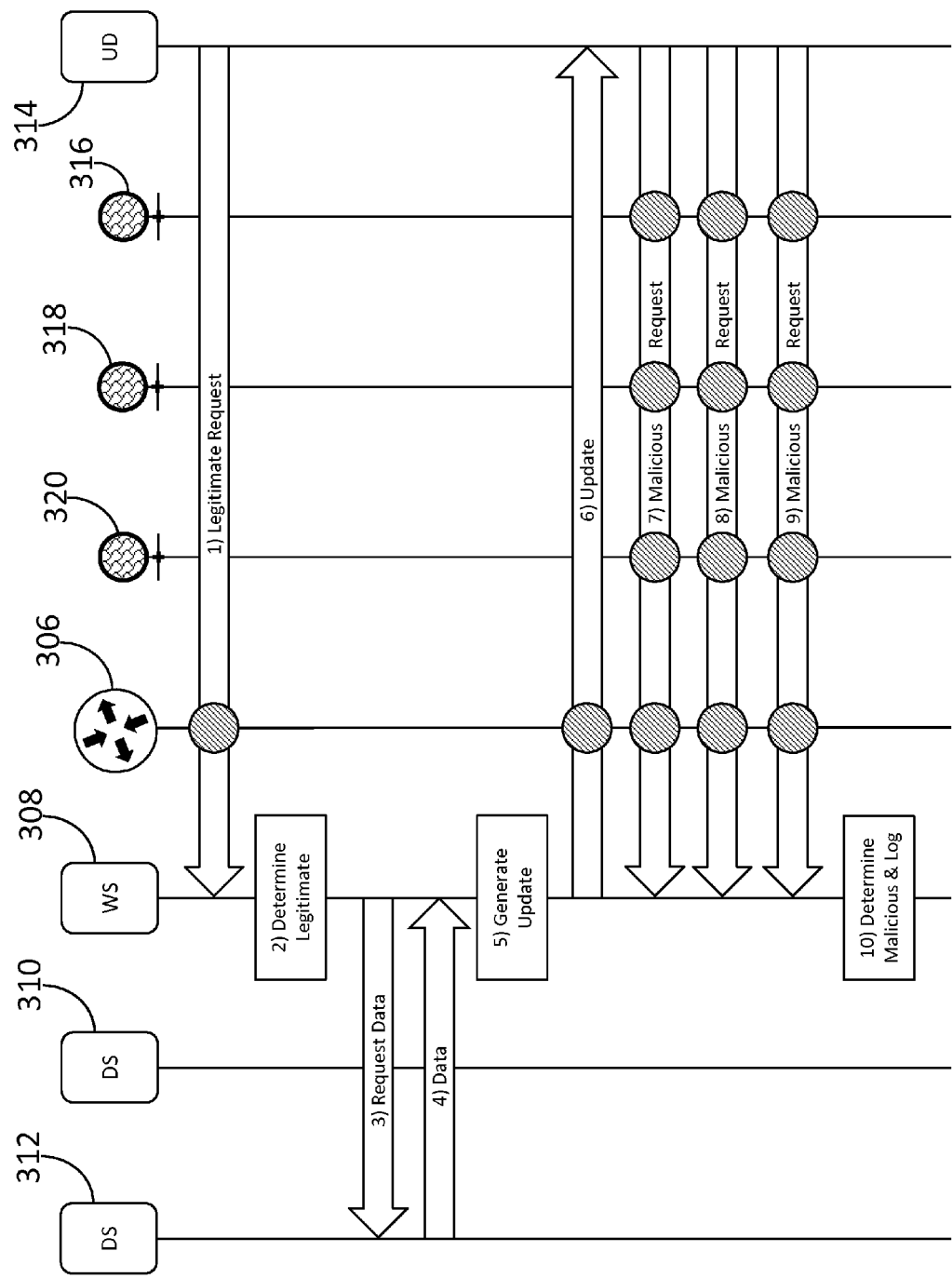
FIG. 4A, FIG. 4B, and FIG. 4C respectively depict first, second, and third portions of an illustrative sequence for malicious request attribution in accordance with one or more aspects of the disclosure.
Figure 4B:
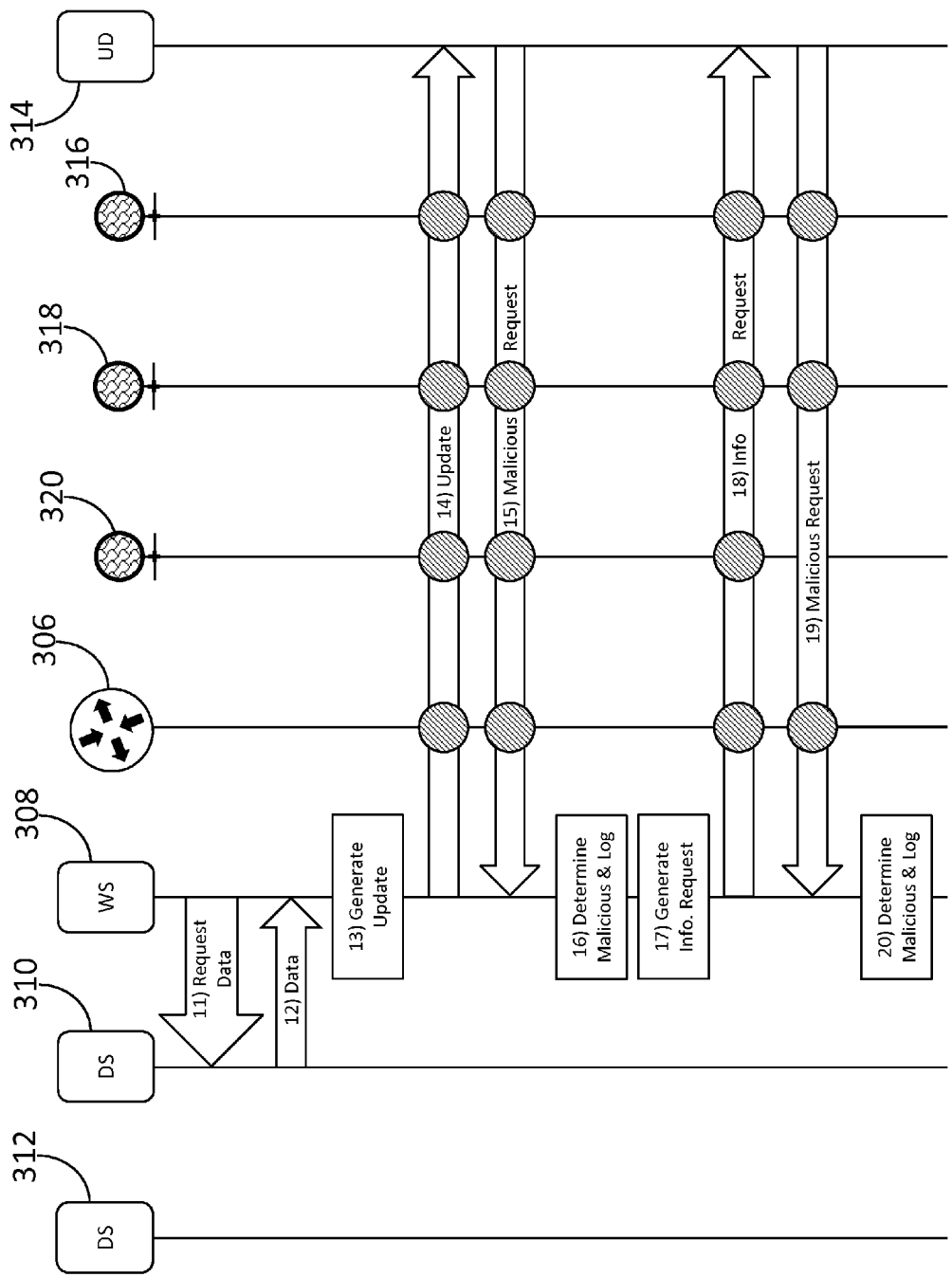
Figure 4C:
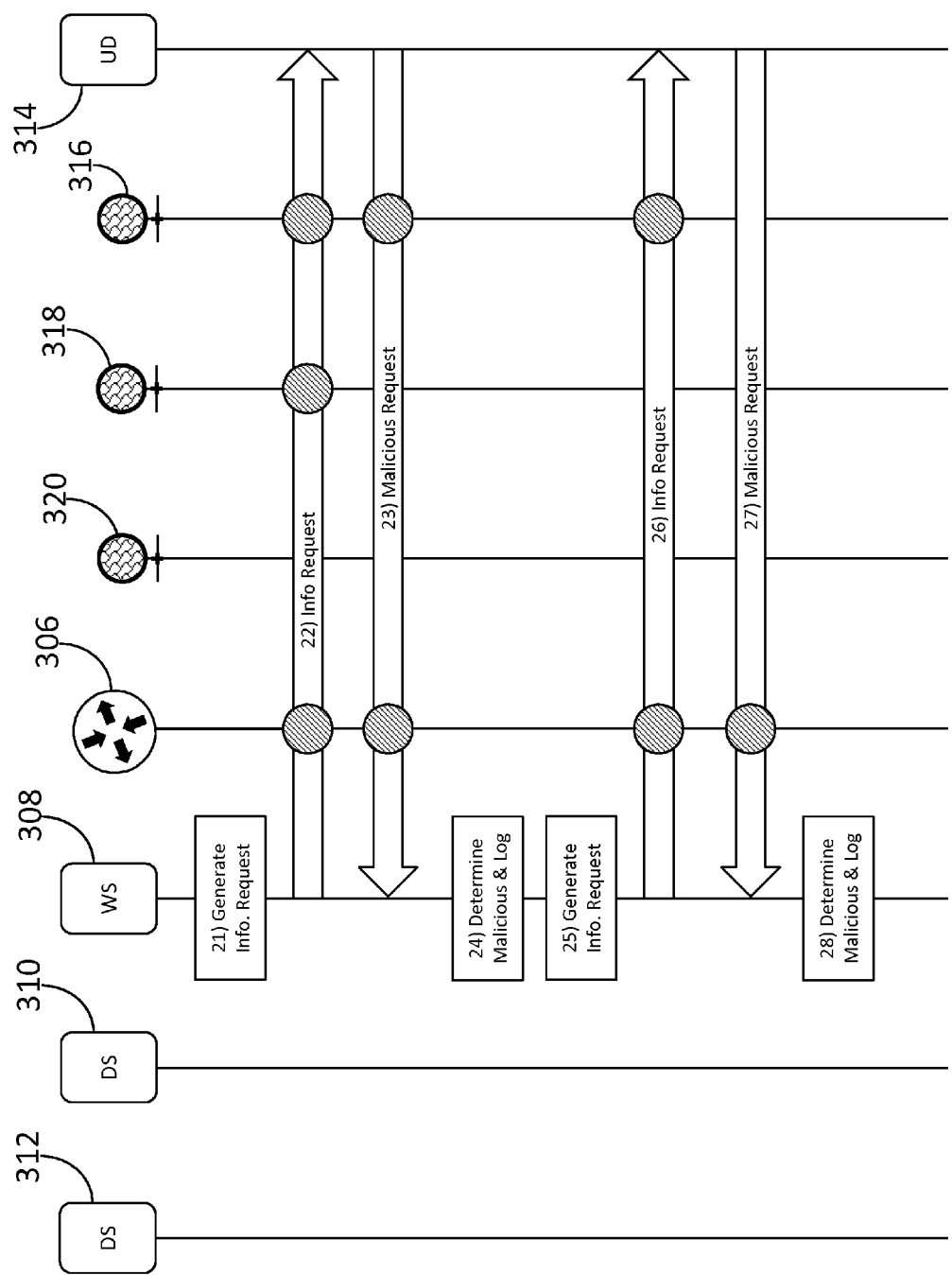

FIG. 4A, FIG. 4B, and FIG. 4C respectively depict first, second, and third portions of an illustrative sequence for malicious request attribution in accordance with one or more aspects of the disclosure. Referring to FIG. 4A, at step 1, user device 314 may generate a request for one or more records (e.g., one or more web pages and/or web page components) and communicate the request to web server 308 via, inter alia, router 306 (as denoted by the shaded circle over the line emanating downward from router 306 in FIG. 4A). At step 2, web server 308 may evaluate the request received from user device 314, and may determine that the request is legitimate. At step 3, web server 308 may request one or more records associated with the request from data server 312. At step 4, data server 312 may retrieve the requested records associated with the request received from user device 314, and communicate the requested records to web server 308. At step 5, web server 308 may utilize the requested records received from data server 312 to generate an update comprising the one or more records (e.g., one or more web pages and/or web page components) requested by user device 314. At step 6, web server 308 may communicate the generated update comprising the one or more requested records to user device 314.

At step 7, user device 314 may utilize proxy device 316 to request that proxy device 318 request that proxy device 320 request one or more records (e.g., one or more web pages and/or web page components) from web server 308, and the request may be communicated to web server 308. Similarly, at step 8, user device 314 may utilize proxy device 316 to request that proxy device 318 request that proxy device 320 request one or more records (e.g., one or more web pages and/or web page components) from web server 308, and the request may be communicated to web server 308; and user device 314 may utilize proxy device 316 to request that proxy device 318 request that proxy device 320 request one or more records (e.g., one or more web pages and/or web page components) from web server 308, and the request may be communicated to web server 308. At step 10, web server 308 may determine that one or more of the requests received from user device 314, via proxy devices 316, 318, and 320, in steps 7, 8, and/or 9 are of a malicious nature, and may log the request(s) and/or information associated with the request(s) (e.g., attribution data corresponding to, for example, one or more of proxy devices 316, 318, and 320, and/or user device 314). In some embodiments, web server 308 may flag the one or more records requested and/or information associated with the request(s) and/or requesting device(s) (e.g., user device 314 and/or one or more of proxy devices 316, 318, and 320) as malicious in nature so that subsequent request(s) associated with the request(s) and/or requesting device(s) may be logged. In some embodiments, web server 308 may determine that the request(s) are of a malicious nature based on the one or more records requested, an IP address of the requesting computing device (e.g., one or more of proxy devices 316, 318, and 320, and/or user device 314), use of one or more shell accounts (e.g., by one or more of proxy devices 316, 318, and 320, and/or user device 314), and/or use of one or more accounts that are suspected of having been compromised (e.g., one or more accounts associated with web server 308 and/or an application supported by web server 308 suspected of being compromised). Additionally or alternatively, web server 308 may determine that the request(s) are of a malicious nature based on a determination that the request(s) were generated by an automated script. In some embodiments, determining that the request(s) were generated by an automated script may include detecting one or more sequence patterns indicative of an automated script (e.g., request(s) for records that would not naturally be requested with one another) and/or one or more timing patterns indicative of an automated script (e.g., request(s) for records in unnaturally rapid succession).

Referring to FIG. 4B, at step 11, web server 308 may request one or more records associated with the request(s) from data server 310. At step 12, data server 310 may retrieve the requested records associated with the request(s) received from user device 314, and communicate the requested records to web server 308. In some embodiments, a "false" data server (e.g., data server 310) may be used for retrieving requested records associated with request(s) determined to be of a malicious nature. For example, if the requested records associated with request(s) determined to be of a malicious nature are for one or more financial account balances associated with accounts that have positive balances, data server 310 may return one or more zero and/or negative balances in response to the request(s). At step 13, web server 308 may utilize the requested records (and/or "false" variations thereof) received from data server 310 to generate an update comprising the one or more records (e.g., one or more web pages and/or web page components) requested by user device 314, via proxy devices 316, 318, and 320. In some embodiments, web server 308 may include in the generated update one or more requests for obtaining information about the requesting computing device (e.g., user device 314 and/or one or more of proxy devices 316, 318, and 320). For example, web server 308 may include in the generated update one or more requests for obtaining an IP address of the requesting computing device, information stored in one or more cookies on the requesting computing device, information identifying a browser utilized by the requesting computing device, information identifying one or more plugins enabled by a browser utilized by the requesting computing device, information identifying one or more fonts available on the requesting computing device, information identifying one or more screen resolutions utilized by the requesting computing device, information identifying an operating system utilized by the requesting computing device, and/or information identifying a hardware configuration of the requesting computing device. Additionally or alternatively, web server 308 may include in the generated update one or more requests for obtaining information about the requesting computing device configured to interrupt an automated script that has been determined to be generating the requests. At step 14, web server 308 may communicate the generated update comprising the one or more requested records (and/or "false" variations thereof), as well as the request(s) for obtaining information about the requesting computing device, to user device 314, via router 306 and proxy devices 320, 318, and 316.

Upon receiving the generated update including the request(s) for obtaining information about the requesting computing device and/or the one or more records (e.g., one or more web pages and/or web page components), the one or more records may appear unusual (e.g., contain one or more "false" data records and/or fail to render properly), and a user of user device 314 may alter one or more subsequent requests of a malicious nature (e.g., cease utilizing an automated script and instead perform one or more manual requests of a malicious nature). For example, at step 15, user device 314 may utilize proxy device 316 to request that proxy device 318 request that proxy device 320 request one or more records (e.g., one or more web pages and/or web page components) from web server 308, and the request may be communicated to web server 308. At step 16, web server 308 may determine that the request received from user device 314, via proxy devices 316, 318, and 320, in step 15 is of a malicious nature, and may log the request and/or information associated with the request (e.g., attribution data corresponding to, for example, one or more of proxy devices 316, 318, and 320, and/or user device 314). In some embodiments, web server 308 may determine that the request is of a malicious nature based on detecting the utilization of one or more proxy devices (e.g., proxy device 316, 318, and/or 320), which may be intentionally being utilized by a user of user device 314 to obfuscate user device 314 and/or one or more attributes of user device 314. At step 17, web server 308 may generate one or more requests for obtaining information about the requesting computing device (e.g., user device 314 and/or one or more of proxy devices 316, 318, and 320). In some embodiments, the request(s) for obtaining information about the requesting computing device may include one or more requests configured to require the requesting computing device to provide information identifying one or more attributes about the requesting computing device via the one or more proxy devices being utilized to obfuscate the requesting computing device, one or more requests configured to cause the one or more proxy devices being utilized to obfuscate the requesting computing device to fail to obfuscate one or more attributes of the requesting computing device, and/or one or more requests configured to cause subsequent requests received via the one or more proxy devices being utilized to obfuscate the requesting computing device to fail to obtain one or more records requested therein (and/or one or more non-"false" variations thereof). At step 18, web server 308 may communicate the request(s) for obtaining information about the requesting computing device, to user device 314, via router 306 and proxy devices 320, 318, and 316.

Upon receiving the request(s) for obtaining information about the requesting computing device and/or the one or more records (e.g., one or more web pages and/or web page components), the one or more records may appear unusual (e.g., contain one or more "false" data records and/or fail to render properly), and a user of user device 314 may alter one or more subsequent requests of a malicious nature (e.g., reduce the number of proxy devices utilized). For example, at step 19, user device 314 may utilize proxy device 316 to request that proxy device 318 request one or more records (e.g., one or more web pages and/or web page components) from web server 308, and the request may be communicated to web server 308. At step 20, web server 308 may determine that the request received from user device 314, via proxy devices 316 and 318, in step 19 is of a malicious nature, and may log the request and/or information associated with the request (e.g., attribution data corresponding to, for example, one or more of proxy devices 316 and 318, and/or user device 314). In some embodiments, web server 308 may determine that the request is of a malicious nature based on detecting the utilization of one or more proxy devices (e.g., proxy device 316 and/or 318), which may be intentionally being utilized by a user of user device 314 to obfuscate user device 314 and/or one or more attributes of user device 314. Referring to FIG. 4C, at step 21, web server 308 may generate one or more requests for obtaining information about the requesting computing device (e.g., user device 314 and/or one or more of proxy devices 316 and 318). At step 22, web server 308 may communicate the request(s) for obtaining information about the requesting computing device, to user device 314, via router 306 and proxy devices 318 and 316.

Upon receiving the request(s) for obtaining information about the requesting computing device and/or the one or more records (e.g., one or more web pages and/or web page components), the one or more records may appear unusual (e.g., contain one or more "false" data records and/or fail to render properly), and a user of user device 314 may alter one or more subsequent requests of a malicious nature (e.g., reduce the number of proxy devices utilized). For example, at step 23, user device 314 may utilize proxy device 316 to request one or more records (e.g., one or more web pages and/or web page components) from web server 308, and the request may be communicated to web server 308. At step 24, web server 308 may determine that the request received from user device 314, via proxy device 316, in step 23 is of a malicious nature, and may log the request and/or information associated with the request (e.g., attribution data corresponding to, for example, proxy device 316 and/or user device 314). In some embodiments, web server 308 may determine that the request is of a malicious nature based on detecting the utilization of one or more proxy devices (e.g., proxy device 316), which may be intentionally being utilized by a user of user device 314 to obfuscate user device 314 and/or one or more attributes of user device 314. At step 25, web server 308 may generate one or more requests for obtaining information about the requesting computing device (e.g., user device 314 and/or proxy device 316). At step 26, web server 308 may communicate the request(s) for obtaining information about the requesting computing device, to user device 314, via router 306 and proxy device 316.

Upon receiving the request(s) for obtaining information about the requesting computing device and/or the one or more records (e.g., one or more web pages and/or web page components), the one or more records may appear unusual (e.g., contain one or more "false" data records and/or fail to render properly), and a user of user device 314 may alter one or more subsequent requests of a malicious nature (e.g., make a direct request without utilizing a proxy device). For example, at step 27, user device 314 may request one or more records (e.g., one or more web pages and/or web page components) from web server 308, and the request may be communicated to web server 308. At step 28, web server 308 may determine that the request received from user device 314 in step 27 is of a malicious nature, and may log the request and/or information associated with the request (e.g., attribution data corresponding to, for example, user device 314). By detecting request(s) of a malicious nature and then responding to those request(s) with one or more requests for obtaining information about the requesting computing device, a user generating the malicious request(s) may be forced to reduce the number of proxy devices utilized and thus reduce the level of obfuscation provided by proxy devices and/or abandon the use of proxy devices altogether. As the user generating the malicious request(s) reduces the number of proxy devices utilized to obfuscate the requesting computing device, and/or abandons the use of proxy devices altogether, the logged information associated with the malicious request(s) will more accurately attribute the malicious request(s) to the user and/or computing device utilized by the user. This information may be used to identify the user, one or more computing devices utilized by the user, and/or one or more Internet Service Providers (ISPs) associated with the user and/or user device(s). Accordingly, one or more entities receiving the malicious request(s) may utilize such information to mitigate malicious request(s) and/or the effect thereof. Moreover, the knowledge that such information is being gathered may deter users from generating subsequent malicious request(s).

Figure 5:
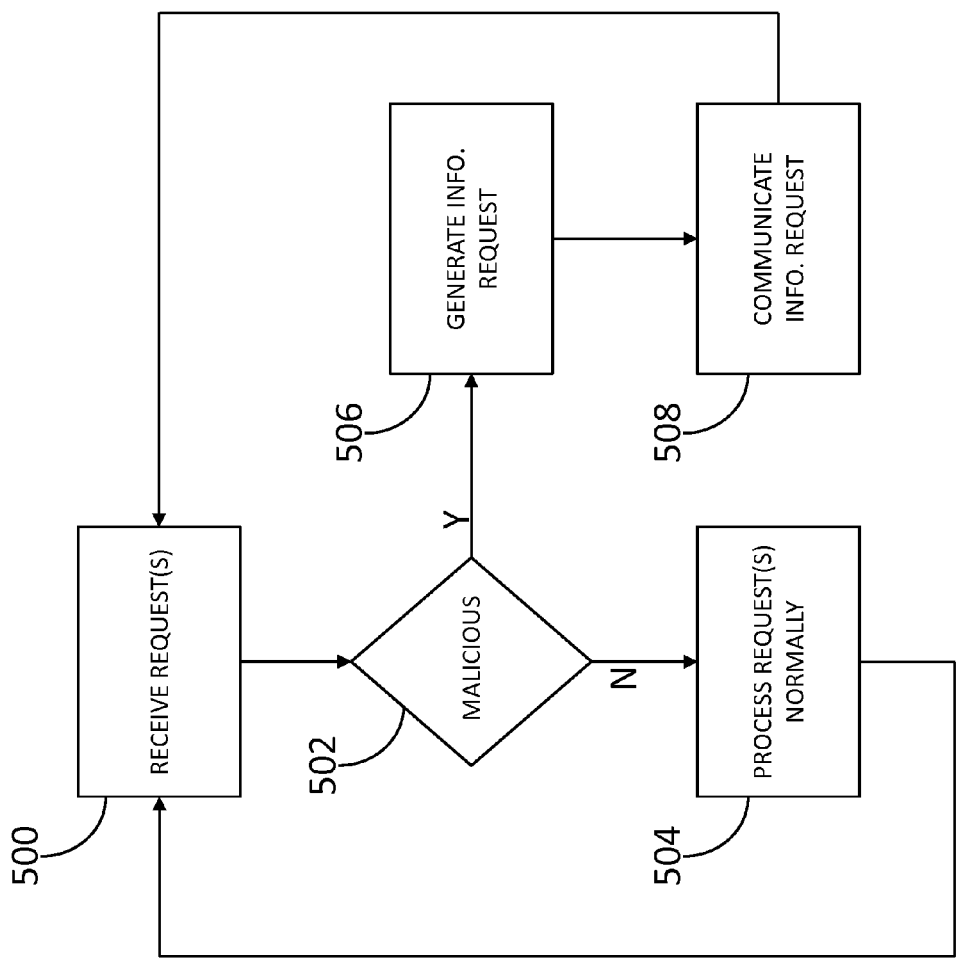
FIG. 5 depicts an example flow diagram of a method for malicious request attribution in accordance with one or more aspects of the disclosure.

FIG. 5 depicts an example flow diagram of a method for malicious request attribution in accordance with one or more aspects of the disclosure. Referring to FIG. 5, at step 500, one or more requests for one or more records may be received. For example, web server 308 may receive one or more requests for one or more records from user device 314. At step 502, a determination may be made as to whether the received request(s) are of a malicious nature. For example, the request(s) received from user device 314 may be determined to not be of a malicious nature (e.g., as described above with respect to the legitimate request received at step 1 of FIG. 4A). Responsive to the request(s) being determined not to be of a malicious nature, at step 504, the request(s) may be processed normally. For example, web server 308 may retrieve one or more records associated with the request(s) from data server 312, generate an update comprising the one or more records (e.g., one or more web pages and/or web page components), and communicate the update to user device 314 (e.g., as described above with respect to steps 3-6 of FIG. 4A). Returning to step 500, one or more additional requests for one or more records may be received. For example, web server 308 may receive one or more requests for one or more records from user device 314. At step 502, a determination may be made as to whether the received request(s) are of a malicious nature. For example, the request(s) received from user device 314 may be determined to be of a malicious nature (e.g., as described above with respect to the malicious requests received at steps 7-9 of FIG. 4A). Responsive to the request(s) being determined to be of a malicious nature, at step 506, one or more requests for obtaining information about the requesting computing device may be generated. For example, web server 308 may generate an update and include in the update one or more requests for obtaining information about user device 314 and/or one or more of proxy devices 316, 318, and 320 (e.g., as described above with respect to step 13 of FIG. 4B). At step 508, the one or more requests for obtaining information about the requesting computing device may be communicated to the requesting computing device. For example, the update including the request(s) for obtaining information about the requesting computing device may be communicated to user device 314 and/or one or more of proxy devices 316, 318, and 320 (e.g., as described above with respect to step 14 of FIG. 4B). The method may then return to step 500 and await one or more additional requests for one or more records.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   at a computing platform comprising at least one processor, a memory, and a communication interface:
   receiving, via the communication interface and from a first computing device, a non-malicious request for data from one or more records stored in the memory;
   receiving, via the communication interface and from a second computing device, a malicious request for the data;
   responsive to a determination, by the at least one processor, that the non-malicious request is not of a malicious nature:
   generating, by the at least one processor, a web page component comprising the data; and
   communicating, via the communication interface and to the first computing device, the web page component; and
   responsive to a determination, by the at least one processor, that the malicious request is of a malicious nature:
   generating, by the at least one processor, one or more requests configured to cause the second computing device to fail to properly render at least a portion of a web page comprising data from at least one of the one or more records; and
   communicating, via the communication interface and to the second computing device, the one or more requests.

2. The method of claim 1, wherein determining that the malicious request is of a malicious nature comprises determining that the malicious request is of a malicious nature based on at least one of the one or more records, an Internet Protocol (IP) address of the second computing device, use of one or more shell accounts, or use of one or more accounts that are suspected of having been compromised.

3. The method of claim 1, wherein determining that the malicious request is of a malicious nature comprises determining that the malicious request was generated by an automated script.

4. The method of claim 3, wherein determining that the malicious request was generated by an automated script comprises detecting at least one of one or more sequence patterns indicative of an automated script or one or more timing patterns indicative of an automated script.

5. The method of claim 3, wherein the one or more requests are configured to interrupt the automated script.

6. The method of claim 1, comprising at least one of logging subsequent requests for the data or logging subsequent requests received from the second computing device.

7. The method of claim 1, wherein the one or more requests comprise at least one of a request for an Internet Protocol (IP) address of the second computing device, a request for information stored in one or more cookies on the second computing device, a request for information identifying a browser utilized by the second computing device, a request for information identifying one or more plugins enabled by a browser utilized by the second computing device, a request for information identifying one or more fonts available on the second computing device, a request for information identifying one or more screen resolutions utilized by the second computing device, a request for information identifying an operating system utilized by the second computing device, or a request for information identifying a hardware configuration of the second computing device.

8. The method of claim 1, wherein the malicious request is received via one or more proxy devices intentionally utilized by a user of the second computing device to obfuscate the second computing device.

9. The method of claim 8, wherein determining that the malicious request is of a malicious nature comprises detecting utilization of the one or more proxy devices.

10. The method of claim 8, wherein the one or more requests comprise a request configured to require the second computing device to provide, via the one or more proxy devices, information identifying one or more attributes about the second computing device.

11. The method of claim 8, wherein the one or more requests comprise a request configured to cause the one or more proxy devices to fail to obfuscate one or more attributes of the second computing device.

12. The method of claim 8, wherein the one or more requests comprise a request configured to cause subsequent requests received via the one or more proxy devices to fail.

13. The method of claim 1, comprising providing one or more false values to the second computing device.

14. The method of claim 13, wherein the data comprises one or more financial account balances, and wherein the one or more false values comprise at least one of a zero or negative balance associated with an account having a positive balance.

15. A system, comprising:
at least one processor;
a communication interface; and
a memory storing instructions that when executed by the at least one processor cause the system to:
receive, via the communication interface and from a computing device, a request for data from one or more records stored in the memory;
determine, based on one or more indicia, that the request was generated by an automated script; and
responsive to determining that the request was generated by the automated script:
generate one or more requests configured to interrupt the automated script; and
communicate, via the communication interface and to the computing device, the one or more requests.

16. The system of claim 15, wherein the one or more indicia comprise at least one of one or more sequence patterns indicative of an automated script or one or more timing patterns indicative of an automated script.

17. The system of claim 15, wherein the one or more requests comprise at least one of a request for an Internet Protocol (IP) address of the computing device, a request for information stored in one or more cookies on the computing device, a request for information identifying a browser utilized by the computing device, a request for information identifying one or more plugins enabled by a browser utilized by the computing device, a request for information identifying one or more fonts available on the computing device, a request for information identifying one or more screen resolutions utilized by the computing device, a request for information identifying an operating system utilized by the computing device, or a request for information identifying a hardware configuration of the computing device.

18. One or more non-transitory computer-readable media having instructions stored thereon, that when executed by one or more computers, cause the one or more computers to:
receive, from a computing device, a request for data from one or more records stored by the one or more computers;
determine that the request was communicated via one or more proxy devices intentionally utilized by a user of the computing device to obfuscate the computing device; and
responsive to determining that the request was communicated via the one or more proxy devices:
generate one or more requests configured to require the computing device to provide, via the one or more proxy devices, information identifying one or more attributes about the computing device; and
communicate, to the computing device, the one or more requests.

19. The one or more non-transitory computer-readable media of claim 18, wherein the one or more requests are configured to cause the one or more proxy devices to fail to obfuscate the one or more attributes.

20. The one or more non-transitory computer-readable media of claim 18, wherein the one or more requests comprise at least one of a request for an Internet Protocol (IP) address of the computing device, a request for information stored in one or more cookies on the computing device, a request for information identifying a browser utilized by the computing device, a request for information identifying one or more plugins enabled by a browser utilized by the computing device, a request for information identifying one or more fonts available on the computing device, a request for information identifying one or more screen resolutions utilized by the computing device, a request for information identifying an operating system utilized by the computing device, or a request for information identifying a hardware configuration of the computing device.

* * * * *